United States Patent
Chuang

(10) Patent No.: US 9,378,107 B2
(45) Date of Patent: Jun. 28, 2016

(54) COMPUTER SYSTEM AND USB DEVICE DETECTING METHOD THEREOF

(71) Applicant: Quanta Computer Inc., Kuei Shan Hsiang, Tao Yuan Shien (TW)

(72) Inventor: Tung-Lin Chuang, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 292 days.

(21) Appl. No.: 14/297,914

(22) Filed: Jun. 6, 2014

(65) Prior Publication Data

US 2015/0234723 A1    Aug. 20, 2015

(30) Foreign Application Priority Data

Feb. 17, 2014    (TW) .............................. 103105055 A

(51) Int. Cl.
| G06F 13/00 | (2006.01) |
| G06F 11/22 | (2006.01) |
| G06F 11/30 | (2006.01) |

(52) U.S. Cl.
CPC ........ *G06F 11/2247* (2013.01); *G06F 11/2284* (2013.01); *G06F 11/3027* (2013.01); *G06F 11/3051* (2013.01)

(58) Field of Classification Search
CPC ..................................................... G06F 13/00
See application file for complete search history.

(56) References Cited

U.S. PATENT DOCUMENTS

| 2006/0075152 | A1* | 4/2006 | Zhu ...................... G06F 13/4081 710/15 |
| 2010/0073090 | A1* | 3/2010 | Mattos ...................... H03F 1/52 330/254 |

FOREIGN PATENT DOCUMENTS

TW    I245982    12/2005

OTHER PUBLICATIONS

Chinese language office action dated Oct. 27, 2015, issued in application No. TW 103105055.
Regan, T., et al.; "Current Sense Circuit Collection;" Linear Technology; Application Note 105; Dec. 2005; pp. 1-60.

* cited by examiner

*Primary Examiner* — Cheng-Yuan Tseng
(74) *Attorney, Agent, or Firm* — McClure, Qualey & Rodack, LLP

(57) ABSTRACT

A computer system is provided. The computer system includes a USB connector, a voltage generator and a detection module coupled between the voltage generator and the USB connector. The USB connector includes a power pin. The voltage generator provides a first voltage to the power pin of the USB connector. The detection module generates a detection signal, and includes an impedance device coupled between the voltage generator and the power pin of the USB connector and a determining unit. The determining unit determines whether a USB device is coupled to the USB connector according to a cross voltage of the impedance device, and provides the detection signal.

12 Claims, 4 Drawing Sheets

COMPUTER SYSTEM AND USB DEVICE DETECTING METHOD THEREOF

CROSS REFERENCE TO RELATED APPLICATIONS

This application claims priority of Taiwan Patent Application No. 103105055, filed on Feb. 17, 2014, the entirety of which is incorporated by reference herein.

BACKGROUND OF THE INVENTION

1. Field of the Invention

The invention relates to a computer system, and more particularly to a computer system capable of detecting a Universal Serial Bus (USB) device.

2. Description of the Related Art

Currently, a basic input/output system (BIOS) code used to perform boot processes by most computer systems is stored in a read only memory (ROM) of the computer system, such as a serial peripheral interface (SPI) flash memory. When the computer system is enabled, a central processor (CPU) will perform a power-on self test (POST) procedure according to the BIOS code, to check whether each of the basic equipment (e.g. motherboard, graphics card) is normal, and then subsequent procedures are performed. The BIOS code is used to manage the configuration of system date, display mode, floppy disk drives, hard disk type, peripherals (e.g. communication ports, printing port, etc.), and random access memory (RAM) and cache memory. Therefore, the BIOS code is an important boot program for the computer system.

Because Universal Serial Bus (USB) devices are in compliance with Plug and Play, providing universality and convenience of the devices, they have long been widely used in computer peripheral devices. Common computer peripherals, such as mouse, keyboard, storage devices, and so on, all use the USB interface. In the Windows operating system (OS), system authentication defines at least one USB port needing to be equipped, and the boot and debug procedures can be performed via the USB port. Therefore, a device functioning as a boot disk via the USB port is important for the computer system.

For portable computer products, system boot time is usually an important indicator of a system's performance. Windows8/Windows8.1 system authentication has a definite specification for the system boot time. For example, when the storage device is a solid-state drive (SSD) or a hybrid SSD, the computer system needs to complete the boot process within 2 seconds. When the storage device is a traditional motor-driven rotating hard disk, the computer system needs to complete the boot process within 4 seconds.

As manufacturers of USB devices are numerous and initialization time is different for each USB device, when the computer system is ready to determine whether a USB device is inserted/plugged in, if the USB device does not complete its initialization, it will cause the computer system to mistakenly determine that no USB device is plugged in. Therefore, a computer system capable of detecting a USB device is desired.

BRIEF SUMMARY OF THE INVENTION

Computer systems and a universal serial bus (USB) device detecting method thereof are provided. An embodiment of a computer system is provided. The computer system comprises a USB connector, a voltage generator and a detection module coupled between the voltage generator and the USB connector. The USB connector comprises a power pin. The voltage generator provides a first voltage to the power pin of the USB connector. The detection module generates a detection signal, and comprises an impedance device coupled between the voltage generator and the power pin of the USB connector and a determining unit. The determining unit determines whether a USB device is coupled to the USB connector according to a cross voltage of the impedance device, and provides the detection signal.

Furthermore, another embodiment of a computer system is provided. The computer system comprises a USB connector, a voltage generator and a detection module coupled between the voltage generator and the USB connector. The USB connector comprises a power pin. The voltage generator provides a first voltage to the power pin of the USB connector. The detection module generates a detection signal, and comprises an impedance device coupled between the voltage generator and the power pin of the USB connector, and a determining unit. The determining unit determines whether a USB device is coupled to the USB connector according to a loading current flowing through the impedance device, and provides the detection signal.

Moreover, an embodiment of a USB detecting method for a computer system is provided. A power-on self-test (POST) procedure is performed according to a basic input/output system (BIOS) code. It is determined whether a loading current of a USB device exists during the POST procedure. It is postponed to enumerate the USB device when the loading current of the USB device exists.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
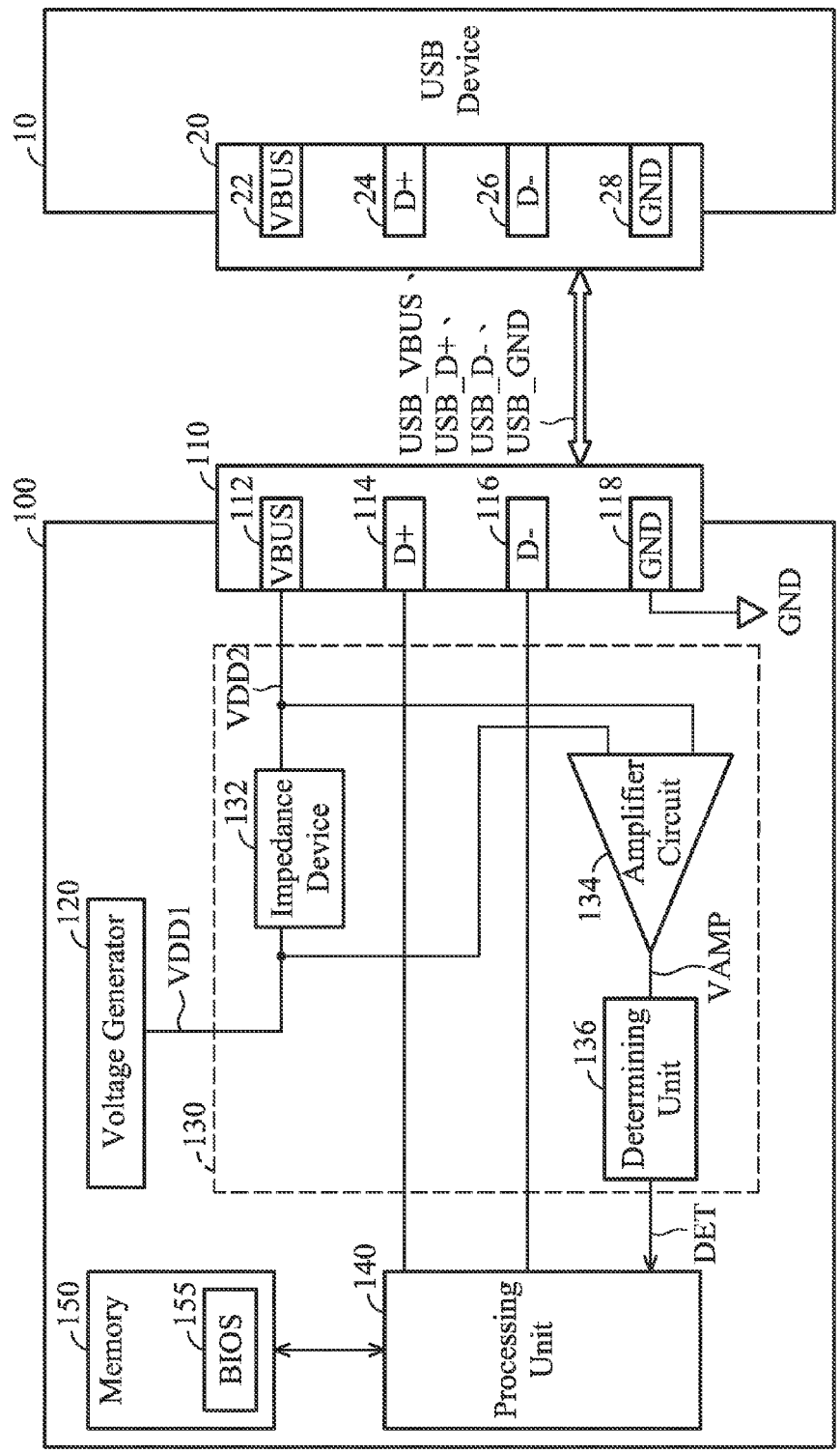
FIG. 1 shows a computer system according to an embodiment of the invention.

FIG. 1 shows a computer system 100 according to an embodiment of the invention. The computer system 100 comprises a connector 110, a voltage generator 120, a detection module 130, a processing unit 140 and a memory 150. The connector 110 is compatible with a receptacle of the Universal Serial Bus (USB) standard, wherein the connector 110 comprises pins 112, 114, 116 and 118. The pin 112 is a power pin VBUS, which is capable of transmitting a power signal USB VBUS of the USB standard. The pins 114 and 116 are data pins D+ and D−, which are capable of transmitting a pair of differential signals USB_D+ and USB_D− of the USB standard. The pin 118 is a ground pin GND, which is capable of transmitting a grounding signal USB_GND. The voltage generator 120 provides a voltage VDD1, wherein the voltage VDD1 has a voltage level 5V. In FIG. 1, when a connector 20 of a USB device 10 is plugged into the connector 110 of the computer system 100, the voltage generator 120 generates a 5V voltage as the power signal USB VBUS of the USB device 10. In the USB device 10, the connector 20 also comprises the pins 22, 24, 26 and 28, wherein the pin 22 is the power pin VBUS, the pins 24 and 26 are the data pins D+ and D−, and the pin 28 is the ground pin GND. The detection module 130 is coupled between the voltage generator 120 and the connector 110, wherein the detection module 130 comprises an impedance device 132, an amplifier circuit 134 and a determining unit 136. The impedance device 132 is coupled between the voltage generator 120 and the pin 112 of the connector 110. The amplifier circuit 134 provides an amplified signal VAMP to the determining unit 136 according to two terminal voltages VDD1 and VDD2 of the impedance device 132. Next, the determining unit 136 determines whether the USB device 10 has been plugged into the computer system 100 according to the amplified signal VAMP, and provides a detection signal DET to the processing unit 140. In general, the processing unit 140 provides a Basic Input/Output System (BIOS) code 155 stored in the memory 150 to a central processing unit (CPU), so as to perform a Power-on self-test (POST) procedure. When the POST procedure is performing, if the detection module 130 detects that the USB device 10 has plugged into the computer system 100, the detection module 130 provides the detection signal DET to notify the processing unit 140. Thus, the processing unit 140 postpones accessing the USB device 10, to ensure that the USB device 10 has completed its self-initialization, and then the USB device 10 can be identified and enumerated. Therefore, erroneous judgments in determining whether a USB device 10 has been plugged into are avoided. In one embodiment, the processing unit 140 may be a south-bridge circuit, and the voltage generator 120 may be a power management module.

Figure 2:
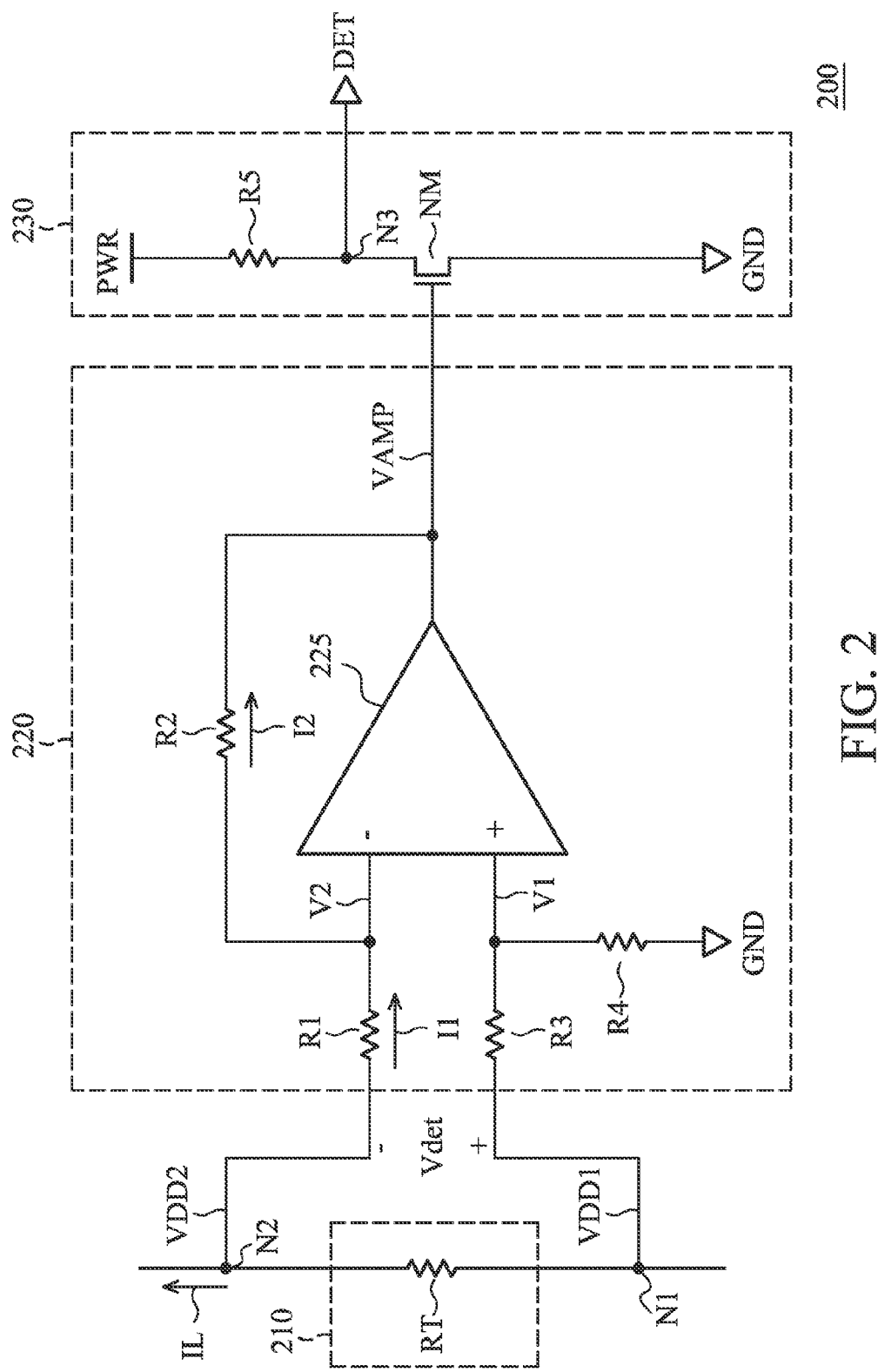
FIG. 2 shows a detection module according to an embodiment of the invention.

FIG. 2 shows a detection module 200 according to an embodiment of the invention. The detection module 200 comprises an impedance device 210, an amplifier circuit 220 and a determining unit 230. Referring to FIG. 1 and FIG. 2 together, the impedance device 210 is coupled between a node N1 and a node N2, wherein the node N1 is coupled to the voltage generator 120, and the node N2 is coupled to the pin 112 of the connector 110. When the connector 20 of the USB device 10 is plugged into the connector 110 of the computer system 100, the USB device 20 is active, thereby a loading current IL flows through the impedance device 210, wherein the impedance device 210 has an equivalent impedance RT. Therefore, a cross voltage Vdet exists in the two terminals of the impedance device 210, i.e. Vdet=VDD1−VDD2, wherein the voltage VDD1 is higher than the voltage VDD2. In the embodiment, the impedance device 210 may be a loading switch, wherein the loading switch has a turned-on impedance RT. In general, the turned-on impedance is typically between tens and hundreds of milli-ohms, thus the cross voltage Vdet has a slight voltage drop. Next, the amplifier circuit 220 amplifies the cross voltage Vdet to generate the amplified signal VAMP. The amplifier circuit 220 comprises the resistors R1-R4 and an operational amplifier 225. The resistor R1 is coupled between the node N2 and an inverting input terminal of the operational amplifier 225. The resistor R2 is coupled between the inverting input terminal and an output terminal of the operational amplifier 225. The resistor R3 is coupled between the node N1 and a non-inverting input terminal of the operational amplifier 225. The resistor R4 is coupled between the non-inverting input terminal of the operational amplifier 225 and a ground GND. When the loading current IL flows to the impedance device 210, a voltage V1 in the non-inverting terminal of the OP amplifier 225 is equal to VDD1 [R4/(R3+R4)]. Due to the operational amplifier 225 having infinite input impedance, the voltage V1 in the non-inverting terminal and a voltage V2 in the inverting terminal of the OP amplifier 225 are equipotential. Therefore, a current I1 flowing through the resistor R1 is obtained, i.e. I1=[VDD2−V1]/R1. Furthermore, due to the operational amplifier 225 having infinite input impedance, the current I1 flowing through the resistor R1 and the current I2 flowing through the resistor R2 are the same. Therefore, the ratio of resistors R2 and R1 and the ratio of resistors R4 and R3 are the same, i.e. (R2/R1)=(R4/R3), the amplified signal VAMP is obtained according to the voltage V2 and the current I2, wherein VAMP=[1+(R2/R1)]×Vdet. Furthermore, the determining unit 230 comprises a transistor NM and a resistor R5. The transistor NM is coupled between the ground GND and a node N3, wherein the transistor NM is an NMOS transistor. The resistor R5 is coupled to a power terminal PWR, wherein a voltage level of the power terminal PWR is equal to an operating voltage (e.g. 3V) of the processing unit 140 of FIG. 1. In one embodiment, the voltage of the power terminal PWR is provided by the voltage generator 120. In the embodiment, the determining unit 230 is also a level shifter, which is used to convert the amplified signal VAMP into the operating voltage level of the processing unit 140. In FIG. 2, when no loading current IL flows to the impedance device 210 (i.e. the USB device 10 does not be plugged into the computer system 100), the cross voltage Vdet does not exist, and the amplified signal VAMP is 0. Thus, the transistor NM is turned off, and the determining unit 230 provides the detection signal DET having a first voltage level (e.g. 3V) to the processing unit 140. Conversely, when the loading current IL flows through the impedance device 210 (i.e. the USB device 10 has plugged into the computer system 100), the amplifier circuit 200 amplifies the cross voltage Vdet to generate the amplified signal VAMP. Next, the transistor NM is turned on by the amplified signal VAMP, and the determining unit 230 provides the detection signal DET having a second voltage level (e.g. 0V) to the processing unit 140. Therefore, the processing unit 140 can determine whether the USB device 10 has plugged in according to the voltage level of the detection signal DET. For example, in one embodiment, when the voltage level of the detection signal DET exceeds a specific voltage Vt, the determining unit 230 will determine that the USB device 10 is plugged into the computer system 100. Conversely, when the voltage level of the detection signal DET does not exceed the specific voltage Vt, the determining unit 230 will determine that no USB device has plugged into the computer system 100.

Figure 3:
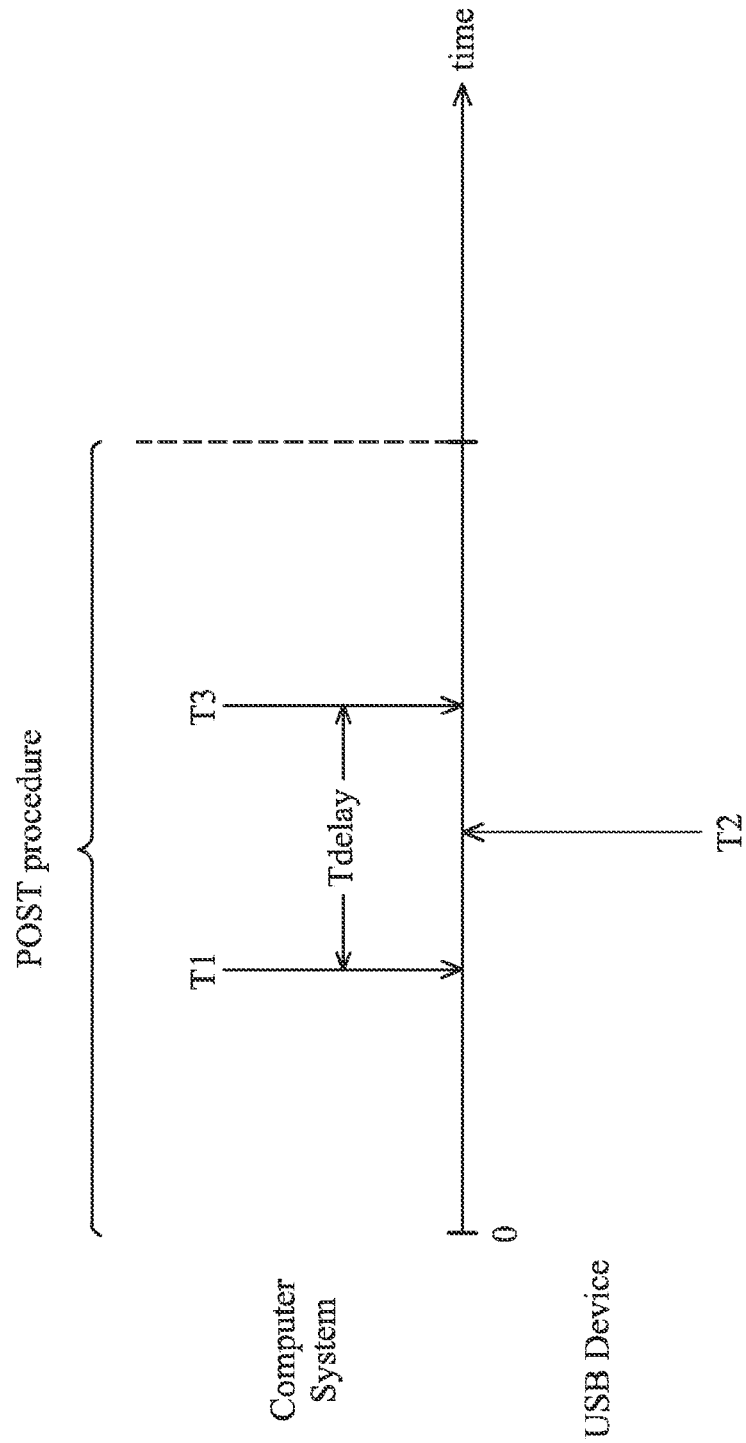
FIG. 3 shows a schematic illustrating time points for identifying a USB device during a POST procedure of a computer system.

FIG. 3 shows a schematic illustrating time points for identifying a USB device during a POST procedure of a computer system. In the POST procedure, a conventional computer system will confirm the presence of the USB device at time point T1, so as to identify and enumerate the USB device. However, if the USB device completes its self-initialization procedure at time point T2 (T2>T1), the conventional computer system will make an incorrect determination that no USB device is plugged in.

Figure 4:
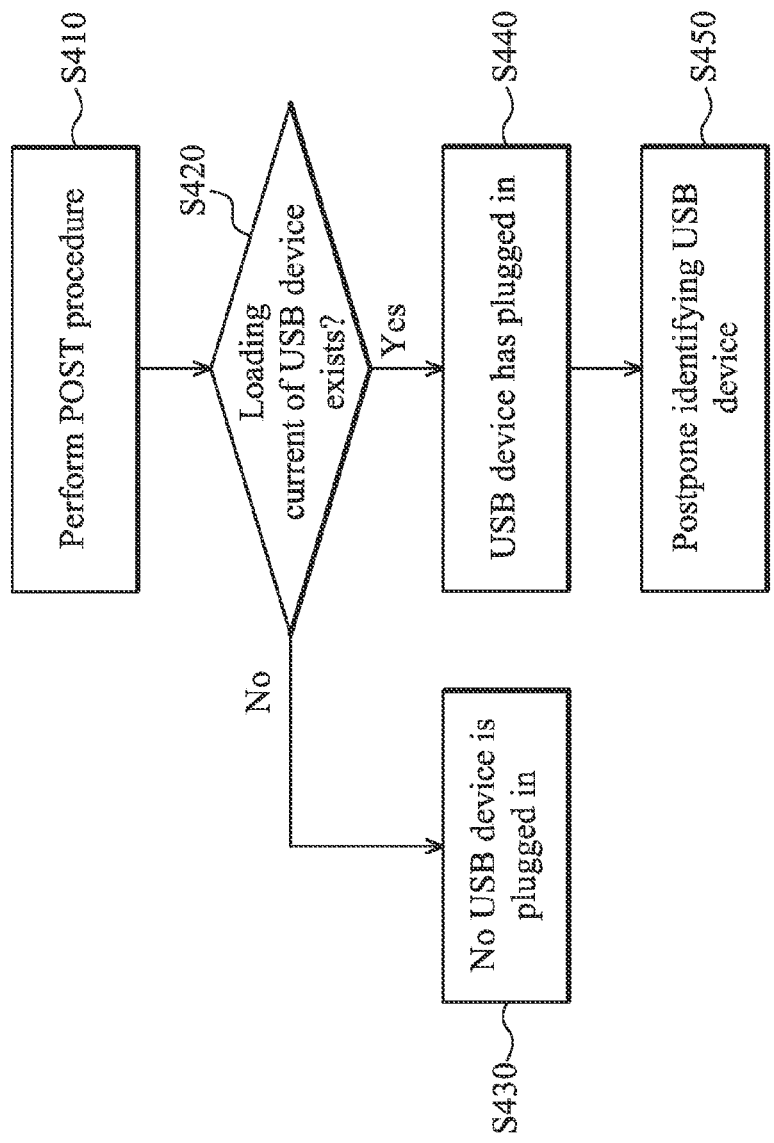
FIG. 4 shows a detecting method of a computer system for detecting whether a USB device has plugged into the computer system according to an embodiment of the invention, wherein the computer system has a detection module.

FIG. 4 shows a detecting method of a computer system for detecting whether a USB device has plugged into the computer system according to an embodiment of the invention, wherein the computer system has a detection module (e.g. the detection module 130 of FIG. 1 or the detection module 200 of FIG. 2). First, in step S410, the computer system reads a BIOS code to perform a POST procedure. Next, during the POST procedure, the computer system will detect whether a loading current of the USB device exists (step S420). As described above, the detection module of the computer system will detect whether the loading current IL or the cross voltage Vdet exists in the impedance device. If no loading current is detected, the computer system determines that no USB device is coupled to the computer system (step S430). Conversely, if the loading current IL is detected, the computer system will determine that the USB device is coupled to the computer system (step S440). Next, the computer system postpones identifying and enumerating the USB device (step S450), to ensure that the USB device has completed its self-initialization. For example, referring back to FIG. 3, in the embodiment, step S420 is performed by the computer system at time point T1 to obtain the detection signal DET. Thus, the computer system can determine whether the USB device is coupled to the computer system according to the detection signal DET. If the detection signal DET indicates that the USB device has plugged into the computer system, the computer system will delay for a time Tdelay the verification and enumeration of the USB device until time point T3. Therefore, the computer system can correctly complete a plugged-in determination for the USB device.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising:
   a universal serial bus (USB) connector, comprising a power pin;
   a voltage generator, providing a first voltage to the power pin of the USB connector; and
   a detection module coupled between the voltage generator and the USB connector, generating a detection signal, and comprising:
      an impedance device coupled between the voltage generator and the power pin of the USB connector;
      a determining unit, determining whether a USB device is coupled to the USB connector according to a cross voltage of the impedance device, and providing the detection signal; and
      an amplifier circuit coupled between the impedance device and the determining unit, amplifying the cross voltage of the impedance device to obtain an amplified signal,
      wherein the determining unit determines that the USB device is coupled to the USB connector when the amplified signal exceeds a specific voltage, and the determining unit determines that the USB device is not coupled to the USB connector when the amplified signal is smaller than or equal to the specific voltage.

2. The computer system as claimed in claim 1, wherein the power pin of the USB connector is compatible with a VBUS pin of USB standard.

3. The computer system as claimed in claim 1, wherein the amplifier circuit comprises:
   an operational amplifier, having an inverting input terminal, a non-inverting input terminal, and an output terminal for providing the amplified signal;
   a first resistor coupled between the power pin of the USB connector and the inverting input terminal of the operational amplifier;
   a second resistor coupled between the inverting input terminal and the output terminal of the operational amplifier;
   a third resistor coupled between the voltage generator and the non-inverting input terminal of the operational amplifier; and
   a fourth resistor coupled between the non-inverting input terminal of the operational amplifier and a ground.

4. The computer system as claimed in claim 3, wherein the determining unit comprises:
   a fifth resistor coupled to a power terminal, wherein a second voltage of the power terminal is smaller than the first voltage; and
   an N-type transistor coupled between the fifth resistor and the ground, having a gate for receiving the amplified signal,
   wherein when the N-type transistor is turned on, the determining unit provides the detection signal having a first voltage level to indicate that the USB device is coupled to the USB connector, and when the N-type transistor is turned off, the determining unit provides the detection signal having a second voltage level to indicate that the USB device is not coupled to the USB connector.

5. The computer system as claimed in claim 1, further comprising:
   a processing unit,
   wherein during a power-on self-test (POST) procedure corresponding to a basic input/output system (BIOS) code being performed, the processing unit determines whether to postpone accessing the USB device according to the detection signal.

6. The computer system as claimed in claim 5, wherein the processing unit postpones accessing the USB device during the POST procedure when the detection signal indicates that the USB device is coupled to the USB connector.

7. A computer system, comprising:
   a universal serial bus (USB) connector, comprising a power pin;
   a voltage generator, providing a first voltage to the power pin of the USB connector; and
   a detection module coupled between the voltage generator and the USB connector, generating a detection signal, and comprising:
      an impedance device coupled between the voltage generator and the power pin of the USB connector;
      a determining unit, determining whether a USB device is coupled to the USB connector according to a loading current flowing through the impedance device, and providing the detection signal; and
      an amplifier circuit coupled between the impedance device and the determining unit, obtaining an amplified signal according to the loading current of the impedance device,
      wherein the determining unit determines that the USB device is coupled to the USB connector when the amplified signal exceeds a specific voltage, and the determining unit determines that the USB device is not coupled to the USB connector when the amplified signal is smaller than or equal to the specific voltage.

8. The computer system as claimed in claim 7, wherein the power pin of the USB connector is compatible with a VBUS pin of USB standard.

9. The computer system as claimed in claim 7, wherein the amplifier circuit comprises:

an operational amplifier, having an inverting input terminal, a non-inverting input terminal, and an output terminal for providing the amplified signal;
a first resistor coupled between the power pin of the USB connector and the inverting input terminal of the operational amplifier;
a second resistor coupled between the inverting input terminal and the output terminal of the operational amplifier;
a third resistor coupled between the voltage generator and the non-inverting input terminal of the operational amplifier; and
a fourth resistor coupled between the non-inverting input terminal of the operational amplifier and a ground,
wherein the operational amplifier obtains a cross voltage of the impedance device corresponding to the loading current via the first and third resistors, and amplifies the cross voltage of the impedance device to provide the amplified signal.

10. The computer system as claimed in claim 9, wherein the determining unit comprises:
a fifth resistor coupled to a power terminal, wherein a second voltage of the power terminal is smaller than the first voltage; and
an N-type transistor coupled between the fifth resistor and the ground, having a gate for receiving the amplified signal,
wherein when the N-type transistor is turned on, the determining unit provides the detection signal having a first voltage level to indicate that the USB device is coupled to the USB connector, and when the N-type transistor is turned off, the determining unit provides the detection signal having a second voltage level to indicate that the USB device is not coupled to the USB connector.

11. The computer system as claimed in claim 7, further comprising:
a processing unit,
wherein during a power-on self-test (POST) procedure corresponding to a basic input/output system (BIOS) code being performed, the processing unit determines whether to postpone accessing the USB device according to the detection signal.

12. The computer system as claimed in claim 11, wherein the processing unit postpones accessing the USB device during the POST procedure when the detection signal indicates that the USB device is coupled to the USB connector.

* * * * *